(12) United States Patent
Kung

(10) Patent No.: US 12,206,701 B1
(45) Date of Patent: Jan. 21, 2025

(54) SYSTEM AND METHOD FOR EVALUATING PERFORMANCE OF A PATCHING PROCESS OF AN ENTERPRISE NETWORK

(71) Applicant: Trend Micro Incorporated, Tokyo (JP)

(72) Inventor: Chi-Chang Kung, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 237 days.

(21) Appl. No.: 18/071,977

(22) Filed: Nov. 30, 2022

(51) Int. Cl.
*H04L 9/40* (2022.01)
*H04L 41/0823* (2022.01)
*H04L 41/0866* (2022.01)

(52) U.S. Cl.
CPC ...... *H04L 63/1433* (2013.01); *H04L 41/0823* (2013.01); *H04L 41/0866* (2013.01); *H04L 63/20* (2013.01)

(58) Field of Classification Search
None
See application file for complete search history.

(56) References Cited

U.S. PATENT DOCUMENTS

| | | | | |
|---|---|---|---|---|
| 2021/0133331 | A1* | 5/2021 | Lipkis | H04L 63/1483 |
| 2021/0390187 | A1* | 12/2021 | Ahmed | G06N 20/00 |
| 2023/0064373 | A1* | 3/2023 | Starr | G06F 21/577 |

OTHER PUBLICATIONS

Brownlee, Jason, "A Gentle Introduction to Object Recognition With Deep Learning", https://machinelearningmastery.com/object-recognition-with-deep-learning/, Deep Learning for Computer Vision, May 22, 2019.
Common Vulnerabilities and Exposures, https://en.wikipedia.org/wiki/Common_Vulnerabilities_and_Exposures, Mar. 29, 2023.
"Introduction to object detection with deep learning", https://www.superannotate.com/blog/object-detection-with-deep-learning, Oct. 19, 2021, Copyright 2023 Super Annotate AI, Inc.
"Patch (computing)", https://wikipedia.org/wiki/Patch_(computing), https:en.wikipedia.org/w/index.php?title=Patch_(computing)&oldid=1142017069, Mar. 29, 2023.

* cited by examiner

*Primary Examiner* — Fatoumata Traore
(74) *Attorney, Agent, or Firm* — Beyer Law Group LLP

(57) ABSTRACT

An enterprise network has endpoints, which are computers with a computer program that needs patches to remove vulnerabilities. A plot of a percentage of vulnerable endpoints over time is generated. Patching cycles and residual phases are identified in the plot. A Residual Vulnerable Percentage (RVP) is determined from the plot, the RVP being an average of percentage of vulnerable endpoints in a residual phase. A Time to Patch Managed (TTPM) is determined from the plot as a time period from a beginning of a patching cycle to a beginning of a residual phase in the patching cycle. A performance indicator that is based on the RVP or the TTPM is compared to a corresponding reference to determine if a corrective action needs to be performed to address deficiencies in the efficiency and/or effectiveness of the patching process.

15 Claims, 11 Drawing Sheets

_US 12,206,701 B1_

SYSTEM AND METHOD FOR EVALUATING PERFORMANCE OF A PATCHING PROCESS OF AN ENTERPRISE NETWORK

TECHNICAL FIELD

The present disclosure is generally directed to computer networks, and more particularly to patching of computer programs in computer networks.

BACKGROUND

An enterprise network is a computer network of an organization, such as a private company, government, educational institution, etc. An enterprise network includes a plurality of computers with computer programs that need to be patched from time to time to remove security-related vulnerabilities. These vulnerabilities include bugs or errors that expose a computer to malicious code, allow unauthorized access to the enterprise network, or other flaw or weakness that may be exploited by an attacker. Once a vulnerability is identified, computers of the enterprise network remains vulnerable until the enterprise network rolls out a patch that removes the vulnerability.

Needless to say, to reduce vulnerability risks, security personnel (e.g., Security Operations Center teams and other Information Technology personnel) of the enterprise network need to ensure that patches are installed in an efficient and effective manner. Unfortunately, most indicators of patching process performance do not provide adequate insight on the entirety of the patching process.

BRIEF SUMMARY

A performance of a patching process of an enterprise network is evaluated by receiving patching operation data pertaining to patching of a computer program that is installed in a plurality of endpoints, which are computers of the enterprise network. The patching operation data indicate timestamps and other data relating to the publication of patches of the computer program and installation of the patches in affected endpoints. A plot of percentage of vulnerable endpoints over time is generated using the patching operation data. Patching cycles are identified in the plot using a machine learning model, with each patching cycle having a time period between availability of a patch to the enterprise network (e.g., publication by the vendor) and availability of a following patch to the enterprise network. Residual phases are identified in the plot using the machine learning model. Each residual phase occurs during a relatively flat section that is within a patching cycle of the plot, the relatively flat section being between a decreasing section and an increasing section of the plot. A Residual Vulnerable Percentage (RVP) is determined by calculating an average of percentage of vulnerable endpoints in a residual phase identified in the plot. A first corrective action is performed on the patching process of the enterprise network in response to a first performance indicator that is based at least on the RVP being higher than a first reference. The first reference may be a threshold RVP value or a statistic of RVPs of patching processes of other enterprise networks.

Evaluation of the performance of the patching process may further include measuring a Time to Patch Managed (TTPM) from a beginning of a patching cycle to a beginning of a residual phase in the patching cycle. A second corrective action is performed on the patching process of the enterprise network in response to a second performance indicator that is based at least on the TPPM being longer than a second reference. The second reference may be a threshold TTPM value or a statistic of TTPMs of patching processes of other enterprise networks.

A corrective action may include closely monitoring the availability and installation of patches, speeding up installation of patches, ensuring that affected endpoints are available for patching, managing more endpoints for patching, and/or other actions that improve the effectiveness and/or efficiency of the patching process.

These and other features of the present disclosure will be readily apparent to persons of ordinary skill in the art upon reading the entirety of this disclosure, which includes the accompanying drawings and claims.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
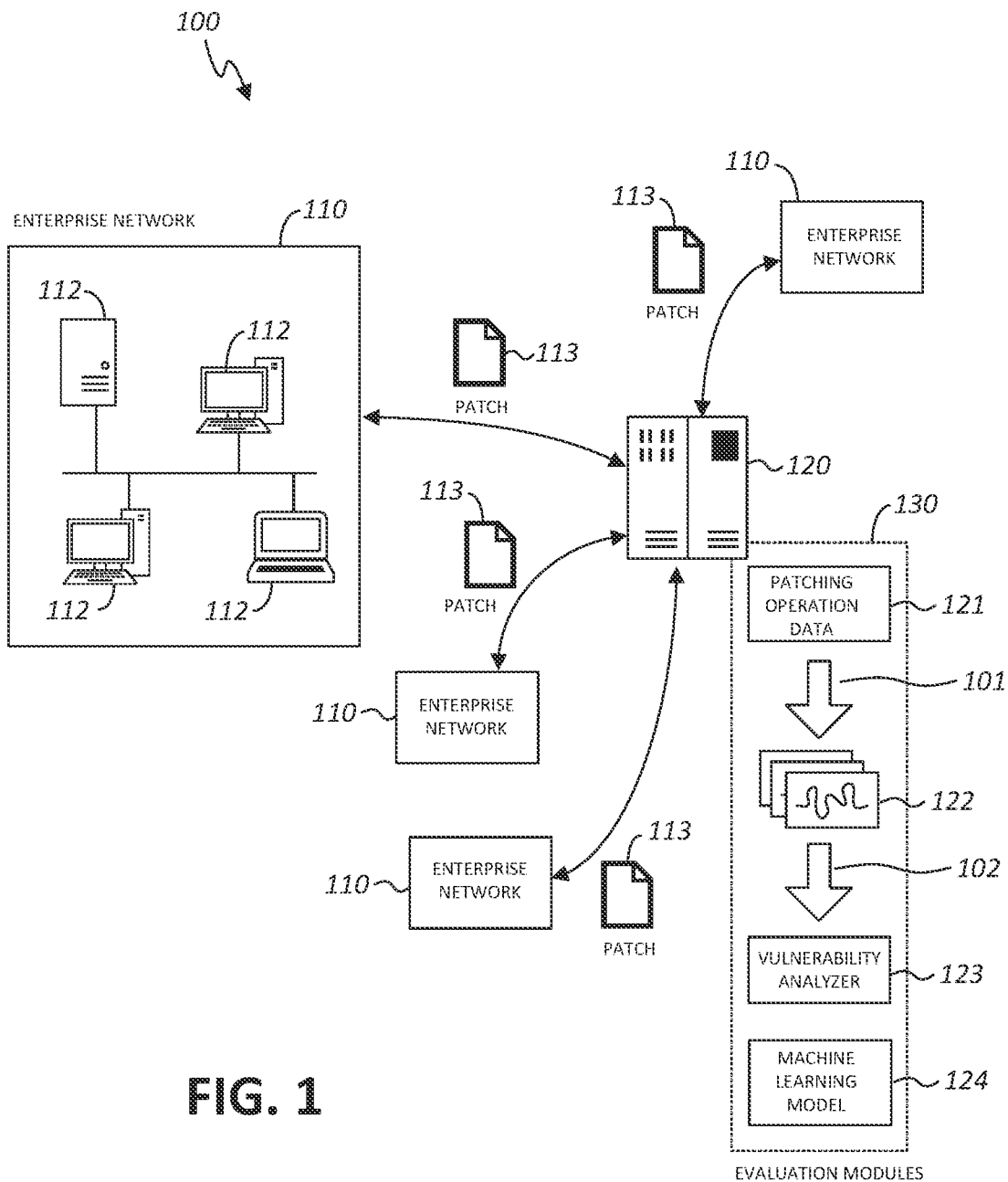
FIG. 1 shows a system for evaluating a performance of patching processes of enterprise networks in accordance with an embodiment of the present invention.
Figure 2:
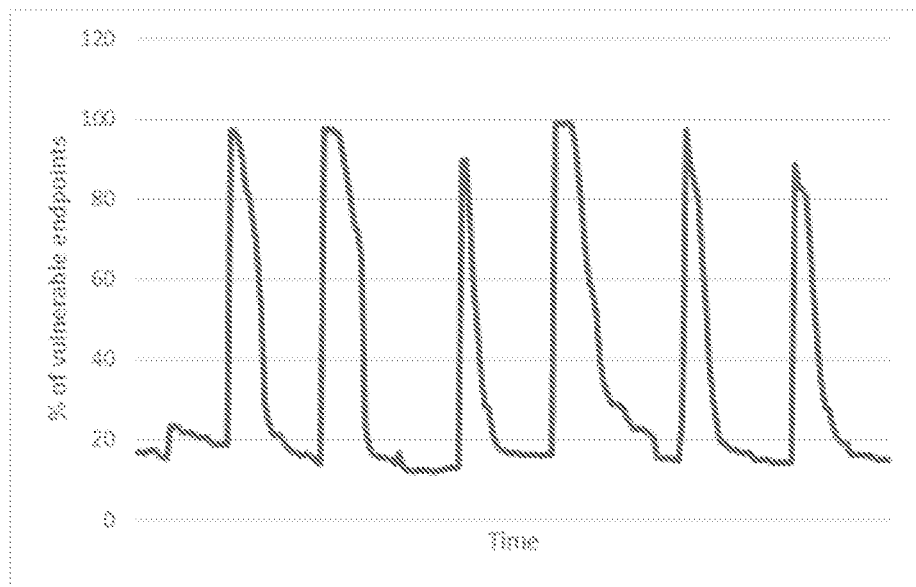
FIGS. 2-5 show example plots of percentage of vulnerable endpoints over time.
Figure 3:
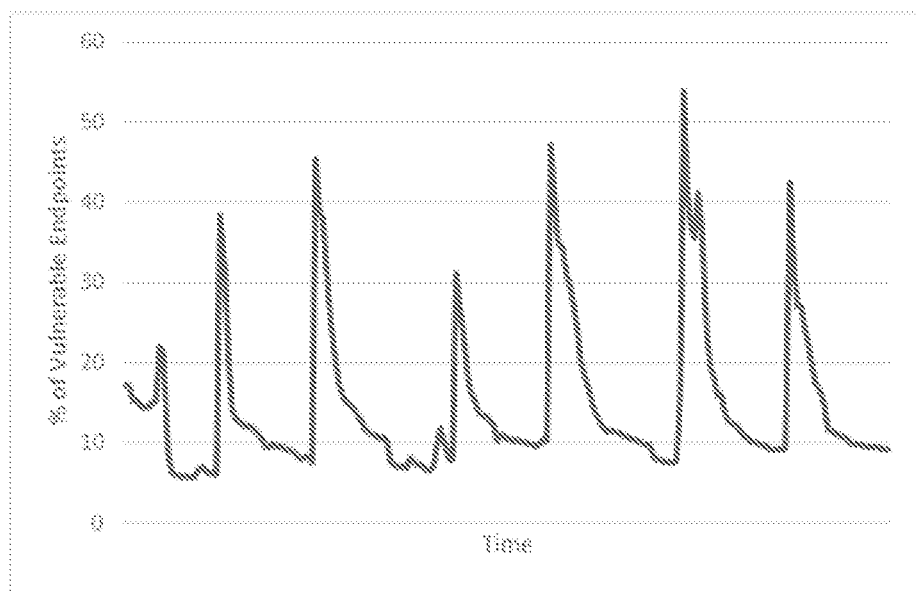
Figure 4:
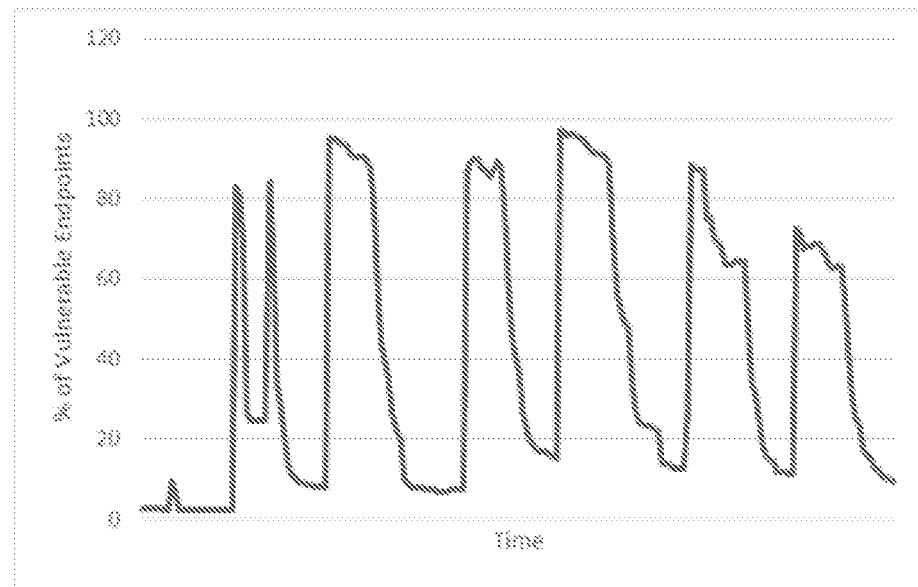
Figure 5:
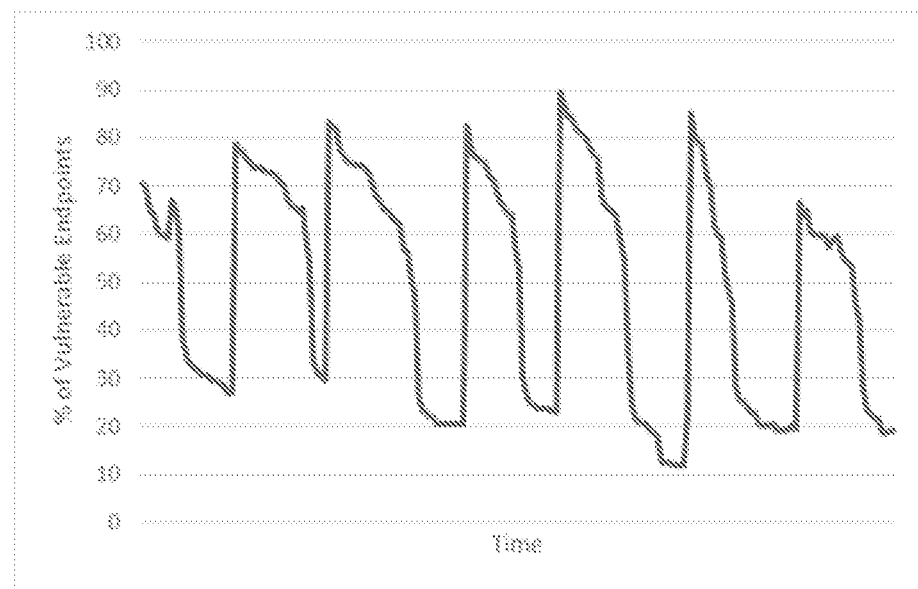

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

In the present disclosure, a "patch" is an update or other fix to a computer program to remove one or more vulnerabilities posed by the computer program. An endpoint is a computer that hosts the computer program needing the patch. The endpoint is deemed to be vulnerable when the one or more vulnerabilities in the computer program are known, but a corresponding patch that removes the one or more vulnerabilities has not been installed in the endpoint. Applying or installing the patch in the endpoint, also referred to as "patching the endpoint," means updating the computer program (in the endpoint) with the patch.

A patching process comprises activities relating to the release of the patch from the vendor of the computer program ("vendor") and installation of the patch in affected endpoints, i.e., endpoints with the computer program that needs or is targeted by the patch. The most popular way to measure the efficiency of a patching process is by calculating a Mean Time to Patch (MTTP), which has a couple of definitions. MTTP may be defined as, Sum of patch completion times of all installation events/total number of installation events where an installation event is the event of installing the patch in an endpoint, and a patch completion time is the patch installation time minus the patch release time. This first definition of MTTP is suitable in cases where incremental patches are published by the vendor of the computer program, such as in the case of the Microsoft Windows™ operating system and older Microsoft Office™ products, which had a monthly security patch release policy.

MTTP may also be defined in terms of the Common Vulnerabilities and Exposure (CVE) as, Sum of CVE completion times of all detected CVEs/ total number of detected CVEs where a CVE completion time is the CVE patched time minus the CVE publication time. This second definition of MTTP, which is in terms of CVE, is suitable for cases where new versions of the computer program must be installed to remove the vulnerabilities, such as in the case of Linux packages, Adobe Acrobat™ products, etc. Note that the CVE publication time is not always the same as the time when a new version of the computer program that addresses the CVE becomes available.

It is to be noted that MTTP gives an indication of the efficiency of the patching process, but does not fully address its effectiveness. More particularly, MTTP gives an indication of efficiency in terms of endpoints that have been patched, but does not consider endpoints that have not been patched (and thus remain vulnerable).

Other metrics relating to patching processes include CVE Density, Percentage of Vulnerable Endpoints for all time (i.e., not limited to a residual phase as discussed below), and Average Unpatched Time. CVE Density is the average number of CVEs per endpoint.

Averaged Unpatched Time (AUT) is the average number of days that a vulnerable endpoint remains unpatched. Given that an endpoint may be affected by multiple CVEs, or has skipped multiple patches, one approach is to select only the oldest patch or the CVE that has been published earliest for AUT calculation; otherwise the endpoint will be overly weighted in the AUT and CVE density calculation.

It is to be noted that CVE Density and Percentage of Vulnerable Endpoints for all time, although simple and straightforward metrics, both address the effectiveness of the patching process: the smaller the CVE Density and the Percentage of Vulnerable Endpoints, the more effective the patching process. AUT, on the other hand, quantifies the risk among all vulnerable endpoints, and is thus an important metric for patching priority. A short AUT indicates that endpoints are vulnerable only within a narrow window of time. A long AUT indicates that the patching of the endpoints are not well-managed. For example, an endpoint can have an unpatched time that is longer than 12 or 24 months when the endpoint has never been patched since the computer program was first installed.

The above-noted patching process metrics provide a simple average that indicates an aspect of the patching process. None of them considers the patching process in terms of patching cycles. More particularly, CVE Density and Percentage of Vulnerable Endpoints oscillate significantly over time, making them difficult to use as a performance metric. For example, when a new vulnerability is published, all endpoints immediately become vulnerable; when all the endpoints are patched, all of these endpoints are no longer vulnerable.

MTTP, as described above, in general does not account for vulnerable endpoints. AUT, similar to Percentage of Vulnerable Endpoints, may be polluted when the majority of endpoints are vulnerable immediately after a new patch is released and none of the endpoints have been patched.

Embodiments of the present invention provide a system and method that take into consideration the entire patching cycle in evaluating the performance of patching processes, thereby allowing cybersecurity personnel to make necessary corrections to the patching process to protect the enterprise network from cyberthreats by removing vulnerabilities in an effective and efficient manner.

Referring now to FIG. 1, there is shown a system 100 for evaluating a performance of patching processes of enterprise networks in accordance with an embodiment of the present invention. The system 100 includes a plurality of enterprise networks 110 and a backend system 120. Components of the system 100 communicate over a computer network including the Internet.

An enterprise network 110 is a computer network of a private company, government, educational institution, or other organization. In the example of FIG. 1, each of the enterprise networks 110 is of a different organization. An enterprise network 110 includes a plurality of endpoints 112, which may be on the same general physical location and/or spread across different physical locations. An endpoint 112 is a computer that hosts a computer program that requires a patch to remove one or more security-related vulnerabilities. Examples of endpoints 112 include desktop computers, laptops, routers, gateways, server computers, etc.

The backend system 120 may comprise one or more computers (e.g., interconnected server computers) with associated software for providing one or more patches 113 to endpoints 112 of the enterprise networks 110. The backend system 120 has evaluation modules 130 for evaluating the performance of patching processes of the enterprise networks 110. In one embodiment, the evaluation modules 130 are implemented as instructions stored in a memory of the backend system 120 that when executed by at least one processor of the backend system 120 cause the backend system 120 to perform the function of the evaluation modules 130. As can be appreciated, the functionality of the evaluation modules 130 may be performed in other computer systems, including in a server computer of one or more enterprise networks 110. The backend system 120, as programmed with the evaluation modules 130, may evaluate the patching process of an enterprise network as described in the present disclosure.

A patching cycle starts when a first patch for a computer program becomes available to an enterprise network and ends when a second patch for the computer program becomes available to the enterprise network, with the second patch being released by the vendor of the computer program following the first patch.

In the example of FIG. 1, the backend system 120 receives patching operation data 121, which is for a particular computer program of a particular enterprise network 110. The patching operation data 121 indicate patches received in the enterprise network 110 for the computer program, endpoints 112 that are affected by the patches, endpoints 112 that have been patched, endpoints 112 that have not been patched, timestamps of when the patches became available to the enterprise network 110, timestamps of when the endpoints 112 were patched, and other patching-related data of the computer program in the enterprise network 110.

In one embodiment, the backend system 120 generates a plot 122 of percentage of vulnerable endpoints over time (see arrow 101). Once a vulnerability posed by a computer program has been identified, the vendor of the computer program will develop and release a patch that will remove the vulnerability. An enterprise network 110 will receive the patch and install the patch to affected endpoints 112, i.e., endpoints 112 that have the computer program that needs to be updated with the patch. The percentage of vulnerable endpoints 112 is the percentage of affected endpoints 112 that have not been patched (and thus remain vulnerable). The percentage of vulnerable endpoints is a measure of the number of affected endpoints 112 that have not been patched relative to all of the affected endpoints 112.

A patching cycle starts when a patch for a computer program becomes available to an enterprise network, which is typically at the publication timestamp of the patch, i.e., the date and time the patch is published by the vendor of the computer program for general release. In one embodiment, a patching cycle is divided into an initial deployment phase, a rapid deployment phase, and a residual phase. The initial deployment phase occurs when the patch is installed in a limited number of endpoints 112 to ensure that the patch is stable and does not introduce new problems. The rapid deployment phase occurs when the patch is released for installation to all affected endpoints 112. The residual phase occurs when the percentage of vulnerable endpoints 112 has stabilized, which happens when patch installation events have become infrequent.

The evaluation modules 130 include a vulnerability analyzer 123 that receives a plot 122 of percentage of vulnerable endpoints 112 over time (see arrow 102). In one embodiment, the vulnerability analyzer 123 employs a machine learning model 124 to identify individual patching cycles and individual residual phases in the plot 122.

The vulnerability analyzer 123 determines a Residual Vulnerable Percentage (RVP) by calculating an average of percentage of vulnerable endpoints in a residual phase that has been identified in the plot 122. The vulnerability analyzer determines a Time to Patch Managed (TTPM) by measuring a time from a start of a patching cycle to a start of a residual phase in the patching cycle. As will be more apparent below, the RVP and TTPM are important indicators of the performance of a patching process, which security personnel can use to monitor and make corrections/improvements to the patching process, and thereby better protect the enterprise network from vulnerability risks.

FIGS. 2-5 show example plots of percentage of vulnerable endpoints over time of typical enterprise networks. In the examples of FIGS. 2-5, the horizontal axis is time (spanning about six months), and the vertical axis is the percentage of vulnerable endpoints. In the example FIGS. 2-5, the patching cycles are about one month apart. The patching cycles are characterized by their repeating pattern of peaks and valleys. A plateau on a peak is indicative of an initial deployment phase, a rapid decrease (in percentage of vulnerable endpoints) from the peak to a valley is indicative of a rapid deployment phase, a relatively flat section on the valley is indicative of a residual phase, and a rapid increase following the flat section is indicative of a following patching cycle. As can be appreciated, although the plots of FIGS. 2-5 are representative, some enterprise networks may have patching processes that do not follow the patterns exhibited by these plots.

Figure 6:
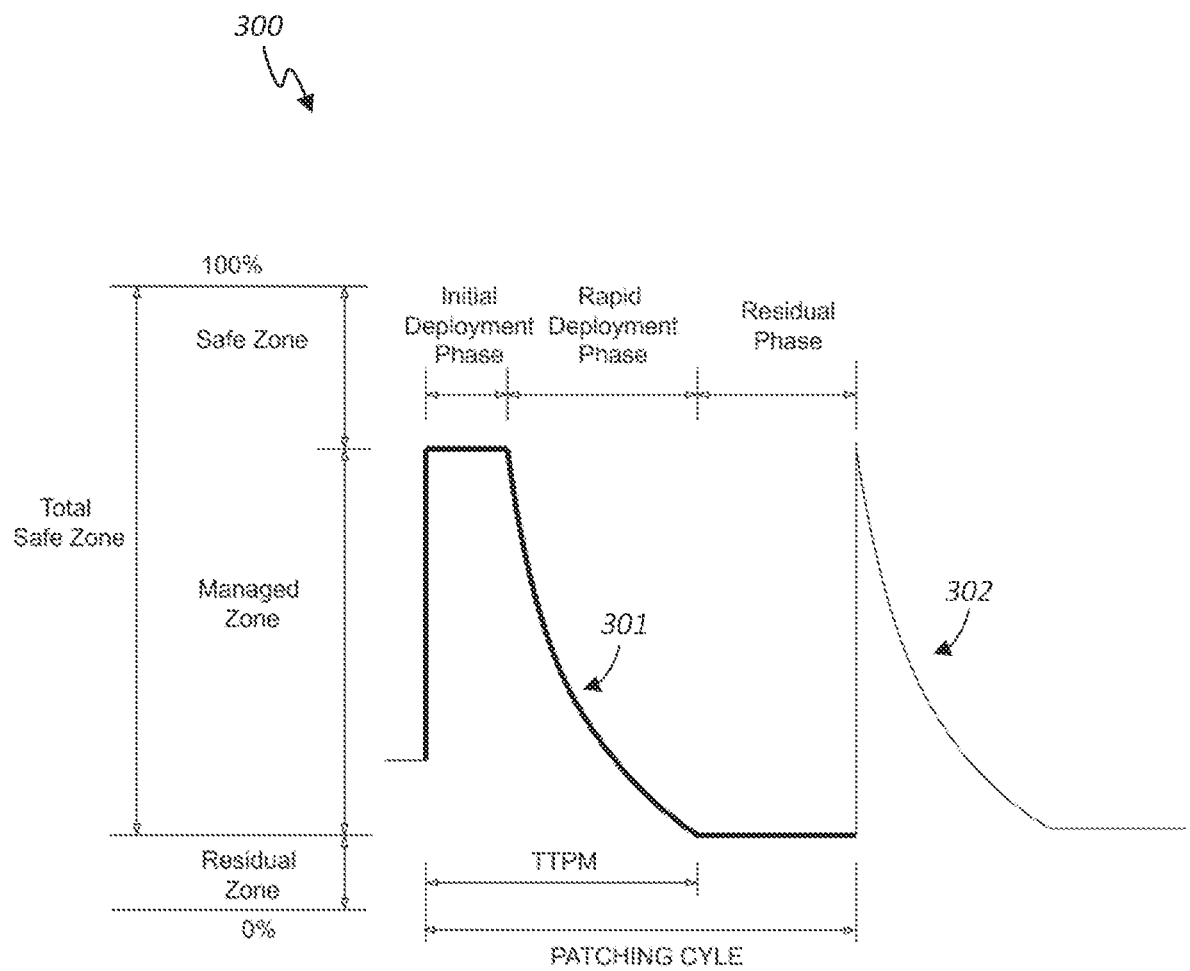
FIG. 6 shows a graphical illustration of a patching cycle model in accordance with an embodiment of the present invention.

FIG. 6 shows a graphical illustration of a patching cycle model 300 in accordance with an embodiment of the present invention. The model 300 is based on insights gained by the inventor from observing the patching processes of enterprise networks as in FIGS. 2-5.

In the model 300, the horizontal axis is time (spanning about one month), and the vertical axis is the percentage of vulnerable endpoints. The vertical axis of the model 300 is divided into three zones, namely (a) a safe zone; (b) a managed zone; and (c) a residual zone. The percentage of vulnerable endpoints in each of the aforementioned zones is measured at the end of the patching cycle.

The percentage of vulnerable endpoints in the safe zone is attributed to endpoints that are either not affected (i.e., not the target of the patch) or are configured to automatically patch such that they are already patched when checked for patch status. Either way, these endpoints are deemed by the model 300 as not vulnerable (i.e., safe), so there is essentially no need to manage their patching. The model 300 presumes that an enterprise network may have endpoints that are not vulnerable in a patching cycle, so the percentage of vulnerable endpoints may not reach 100% in the model 300.

The percentage of vulnerable endpoints in the managed zone is attributed to endpoints that are patched within the patching cycle. The patching of these endpoints is presumed by the model 300 to be managed by the security personnel of the enterprise network. In the model 300, the safe zone and the managed zone, together, are deemed to be a total safe zone.

The model 300 presumes that there are affected endpoints that are not patched during the patching cycle, and thus remain vulnerable at the end of the patching cycle. The percentage of the vulnerable endpoints in the residual zone is attributed to these endpoints, which are not patched during the patching cycle for a variety of reasons, e.g., the roll out of the patch is too slow, the endpoint is not fully controlled by the IT department (e.g., endpoints used by research and development teams), etc.

The horizontal axis of the model 300 may be divided into three phases of a patching cycle, namely an initial deployment phase, a rapid deployment phase, and a residual phase. In the model 300, a plot 301 is a plot of patching cycle that includes all of the just-mentioned three phases. The initial deployment phase, which is also referred to as the planning and testing phase, is characterized by slow installation of the patch. This is because it is not uncommon for an enterprise network to verify that a patch is stable and does not introduce new problems before installing the patch to all affected endpoints. The initial deployment phase starts at the beginning of the patching cycle, and can be identified on the plot as a relatively flat section with a high percentage of vulnerable endpoints at the beginning of the patching cycle.

It is to be noted that some enterprise networks do not have an initial deployment phase. In that case, in the plot, there is no relatively flat section at the beginning of the patching cycle, because the patch is released to be installed on all affected endpoints without first testing the patch on a small number of endpoints. A patching cycle that does not have an initial deployment phase is represented as a plot 302 in the model 300. The plot 302 is for a patching cycle that starts with a rapid deployment phase that is immediately followed by a residual phase.

The rapid deployment phase is characterized by releasing the patch for installation to all affected endpoints. As a result, the percentage of vulnerable endpoints is quickly reduced during the rapid deployment phase. The rapid deployment phase can be identified in the plot as a rapidly decreasing section.

The residual phase is characterized by a low number of patch installation events, i.e., very few if any of remaining affected endpoints are being patched. As a result, the percentage of vulnerable endpoints is stabilized. The residual phase can be identified in the plot as a relatively flat section with a low percentage of vulnerable endpoints at the end of the patching cycle. It is to be noted that some enterprise networks do not have a residual phase. The absence of a residual phase indicates that the patching process of the enterprise network is inefficient (i.e., too slow), resulting in a new patch being published before the previous patch has been installed in the affected endpoints.

In the model 300, Time to Patch Managed (TTPM) is the time from the start of a patching cycle to the beginning of a residual phase (or the end of the rapid deployment phase) in the patching cycle.

Figure 7:
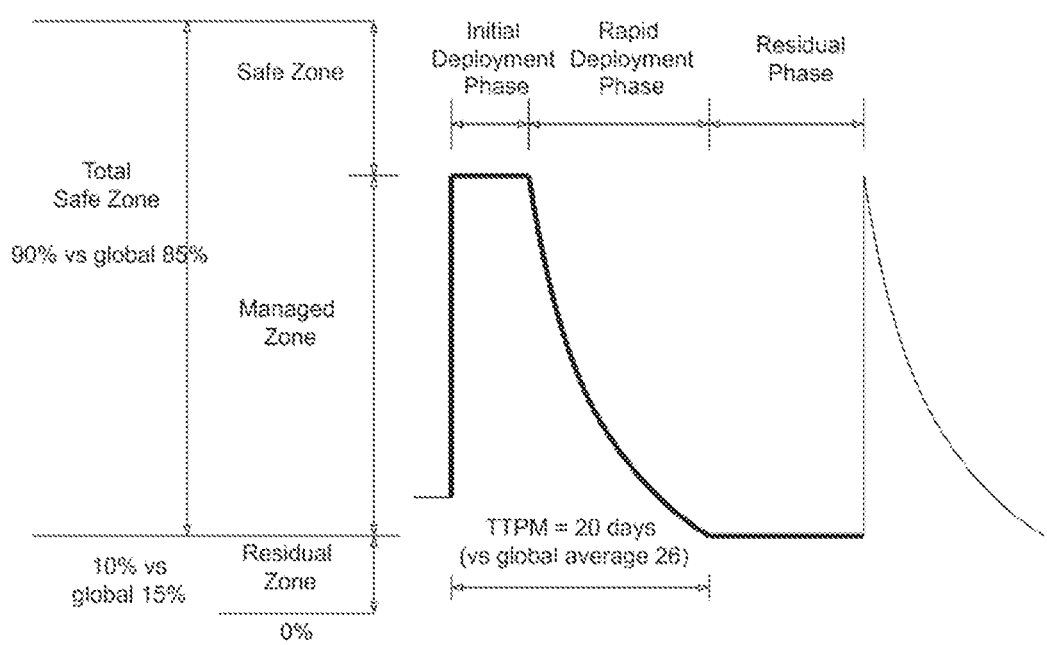
FIGS. 7 and 8 show contrasting examples of plots of percentage of vulnerable endpoints over time of two different enterprise networks.
Figure 8:
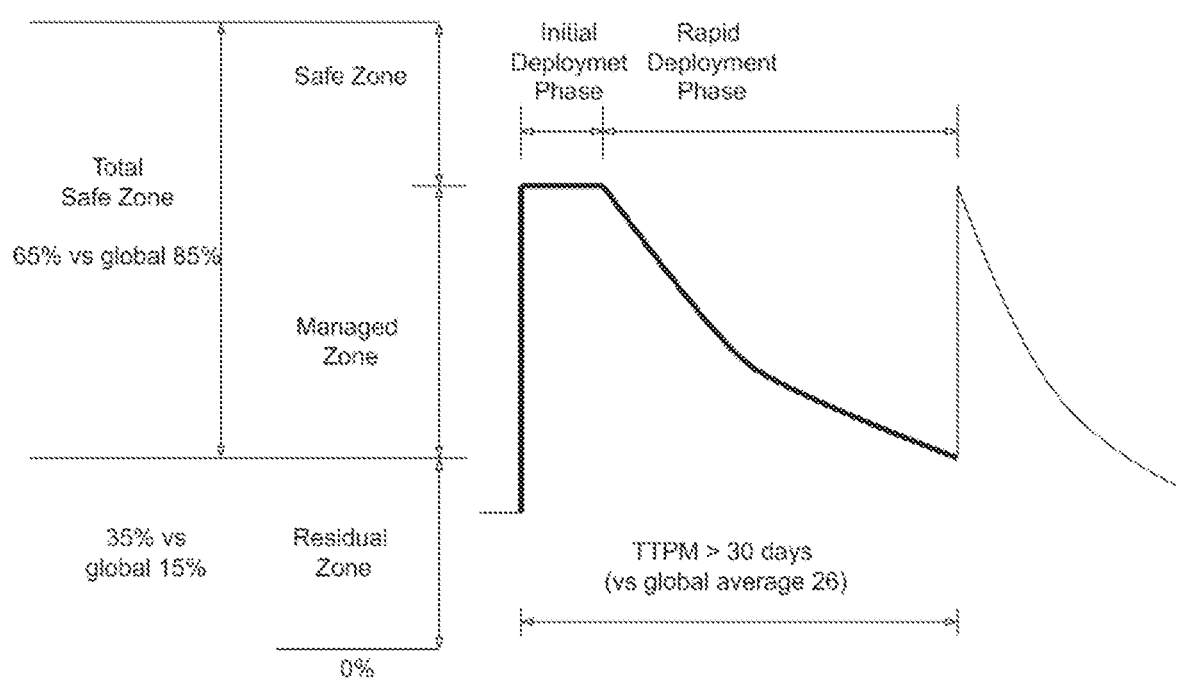

The backend system 120 may evaluate the effectiveness and efficiency of patching processes of an enterprise network in accordance with the model 300 as now explained with reference to FIGS. 7 and 8, which show contrasting examples of patching cycles of two different enterprise networks. In FIGS. 7 and 8, the horizontal axis is time, and the vertical axis is the percentage of vulnerable endpoints. The patching cycle is about 30 days. In the examples of FIGS. 7 and 8, the global (e.g., average among a plurality of different enterprise networks) percentage of vulnerable endpoints in the total safe zone is 85%, the global percentage of vulnerable endpoints in the residual zone is 15%, and the global TTPM is 26 days, which are measured at the end of the patching cycle.

FIG. 7 shows a patching cycle of a first enterprise network with a well-managed patching process. In FIG. 7, the TTPM is 20 days which is shorter than the global average of 26 days. Also, in FIG. 7, the percentage of vulnerable endpoints in the residual zone at the end of the patching cycle is 10%, which is lower than the global average of 15%.

FIG. 8 shows a patching cycle of a second enterprise network with a patching process that is less-managed relative to the first enterprise network. In FIG. 8, the TTPM is greater than 30 days, which is longer than the global average of 26 days. Furthermore, in FIG. 8, the percentage of vulnerable endpoints in the residual zone at the end of the patching cycle is 35%, which is higher than the global average of 15%.

In the model 300, the percentage of vulnerable endpoints at the end of the patching cycle demonstrates the effectiveness of the patching process, which is not clearly revealed by traditional metrics. From the model 300, the Residual Vulnerable Percentage is defined as the average percentage of vulnerable endpoints in the residual phase. A high value of percentage of vulnerable endpoints is expected in the rapid deployment phase, so is excluded in the calculation of the Residual Vulnerable Percentage. If there is no residual phase, the Residual Vulnerable Percentage is defined as the percentage of vulnerable endpoints at the end of the patching cycle. The lower the Residual Vulnerable Percentage, the more effective the patching process. Similarly, residual CVE Density is the CVE Density in the residual phase and measured near or at the end of the patching cycle.

It is to be noted that a short TTPM, not Mean Time to Patch (MTTP), is what enterprise networks really need to achieve, i.e., to patch as many affected endpoints as possible within a patching cycle. This is because MTTP does not give an indication of when all of the affected endpoints will be patched. For example, a patching cycle with no residual phase indicates that the roll out of the patch is too slow (i.e., the patching process is inefficient), which can be clearly detected from the TTPM but is only implicit from the MTTP. However, MTTP is still useful because MTTP represents an average value of patching speed, while TTPM is the total time needed to patch the managed zone, and they offer two different viewpoints. Accordingly, both TTPM and MTTP should be measured and monitored by security personnel.

It is further noted that AUT remains a useful metric because the model 300 does not address the average number of days (which could span many patching cycles) an endpoint remains vulnerable. Nevertheless, Residual AUT, defined as the average of AUT in the residual phase and can be determined from the model 300, is more meaningful as AUT measured across the entire cycle considers vulnerabilities that will be patched within the current cycle (i.e. vulnerabilities mitigated by the latest patch), but Residual AUT focuses more on vulnerabilities that are not patched for a long time, which security personnel need to pay special attention to.

In one embodiment, the vulnerability analyzer 123 uses the machine learning model 124 (shown in FIG. 1) to automatically identify patching cycles, as well as the existence of the residual phase. The machine learning model 124 performs object detection to detect individual patching cycles and residual phases (if present) based on their characteristic shapes in the plot.

FIGS. 9-12 illustrate an operation of the machine learning model 124 in accordance with an embodiment of the present invention. In the example of FIGS. 9-12, the horizontal axis is time, and the vertical axis is the percentage of vulnerable endpoints. The machine learning model 124 is trained to identify one or more patching cycles in a plot of percentage of vulnerable endpoints over time.

Figure 9:
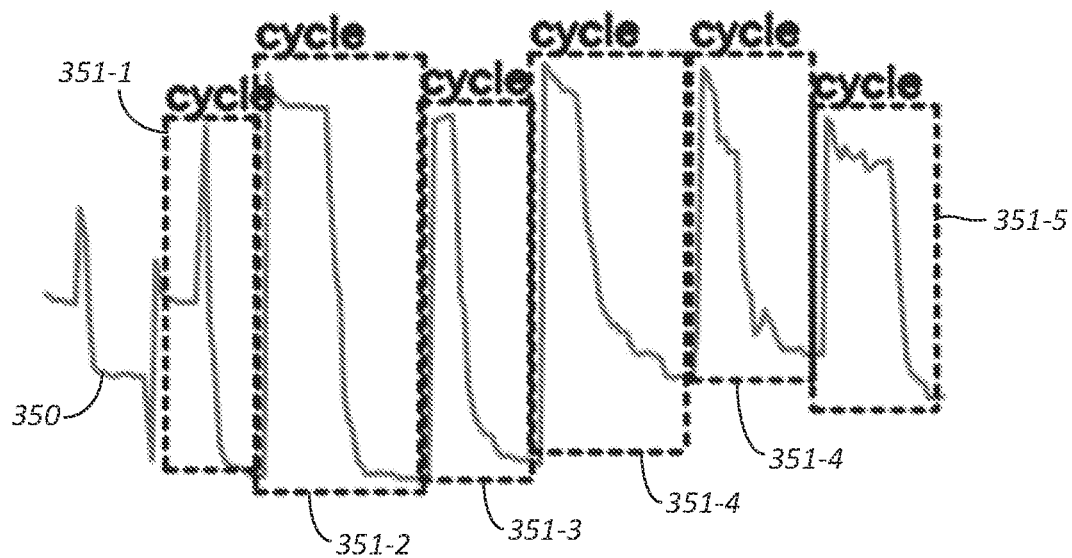
FIGS. 9-12 show plots of percentage of vulnerable endpoints over time that illustrate an operation of a machine learning model in accordance with an embodiment of the present invention.
Figure 10:
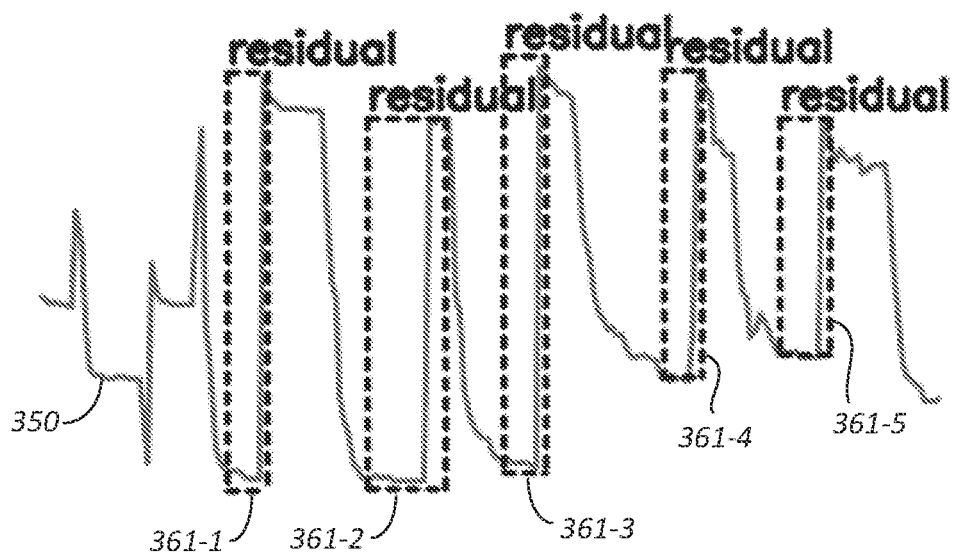

In the example of FIG. 9, the machine learning model 124 identifies and bounds each identified patching cycle in a plot 350 within a bounding box 351 (i.e., 351-1, 351-2, . . . ). As illustrated in the example of FIG. 10, in the plot 350, the machine learning model 124 also identifies and bounds each residual phase within a bounding box 361 (i.e., 361-1, 361-2, . . . ).

Figure 11:
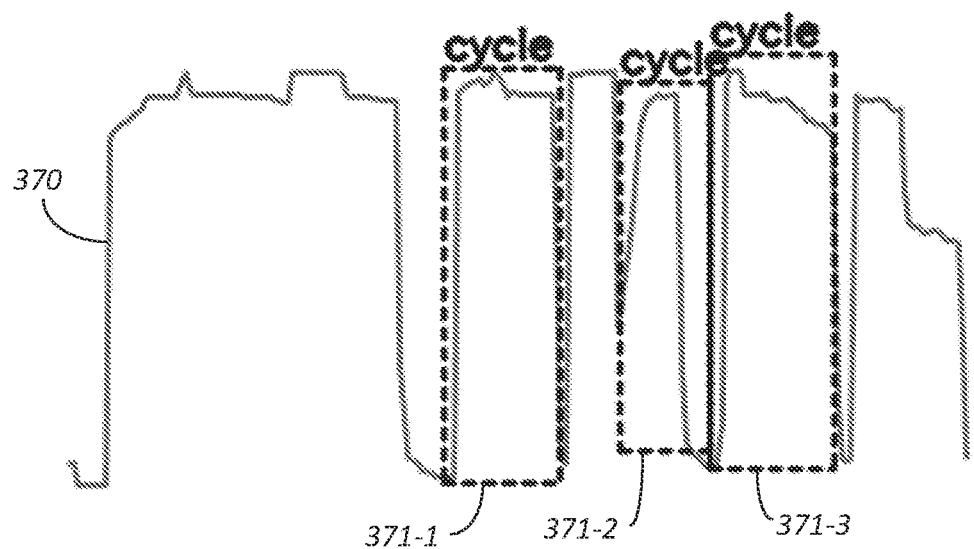
Figure 12:
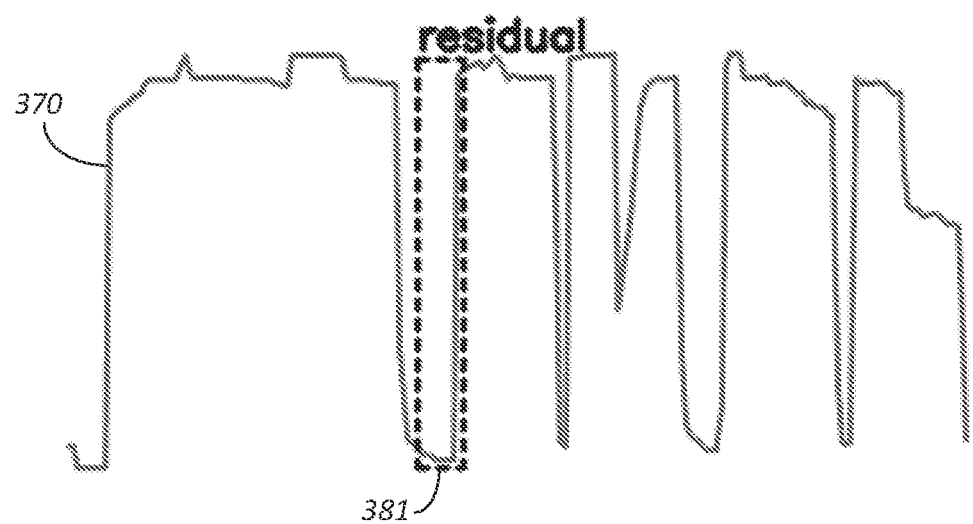

Similarly, in the example of FIG. 11, the machine learning model 124 identifies and bounds each patching cycle in a plot 370 within a bounding box 371 (i.e., 371-1, 371-2, . . . ). As illustrated in the example of FIG. 12, in the plot 370, the machine learning model 124 also identifies and bounds each residual phase within a bounding box 381.

In one embodiment, the machine learning model 124 is a neural network model that is created using a deep learning machine learning algorithm. In one embodiment, the machine learning model 124 is created initially from a so-called pre-trained model that has been trained to detect everyday objects such as cars, books, people, etc. A pre-trained model is typically trained using a large number of training samples, e.g. millions of pictures, but can be fine-tuned using only a small number of training samples.

As can be appreciated, deep learning is well-known and thus is only briefly discussed here. Generally speaking, in deep learning for image processing, the early layers of the neural network are essentially detectors of simple constructs like edges and lines. Later layers of the neural network detect progressively more complex constructs, such as triangles and squares. All of these constructs can be re-used for different purposes. During fine-tuning, all parameters of the pre-trained model are preserved, except those of the last layer, and the latter are fine-tuned using new training samples from actual patching operation data of enterprise networks, e.g., from plots of percentage of vulnerable endpoints over time as in FIGS. 2-5.

In general, the machine learning model 124 is trained to look for a repeating pattern of peaks and valleys to identify a patching cycle. The machine learning model 124 is also trained to identify a residual phase by looking for a relatively flat section that is between a sharp decrease (shape of the rapid deployment phase) and a sharp increase (beginning of the next patching cycle).

Figure 13:
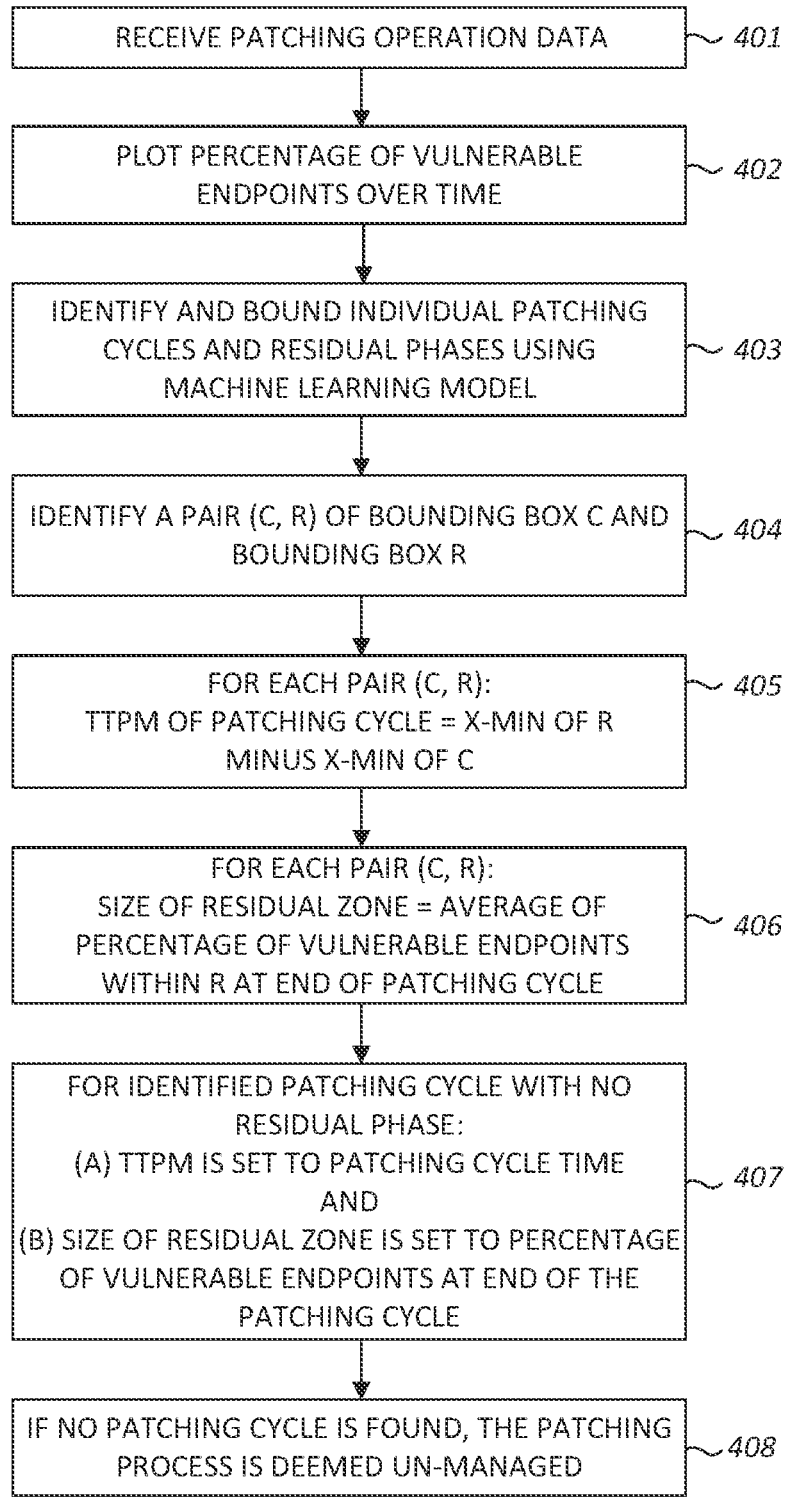
FIG. 13 shows a flow diagram of a method of evaluating a performance of a patching process of an enterprise network in accordance with an embodiment of the present invention.

FIG. 13 shows a flow diagram of a method of evaluating a performance of a patching process of an enterprise network in accordance with an embodiment of the present invention. The method of FIG. 13 may be performed by the backend system 120. As can be appreciated other components may also be employed without detracting from the merits of the present invention.

In the sample of FIG. 13, patching operation data pertaining to a computer program that is installed in a plurality of endpoints of an enterprise network are received in the backend system (step 401). The patching operation data indicate a plurality of patches of the computer program received in the enterprise network and installation of the plurality of patches in the endpoints. A plot of percentage of vulnerable endpoints over time is generated using information from the patching operation data (step 402). Using a machine learning model, individual patching cycles and residual phases are identified in the plot and bound within corresponding bounding borders, which is a bounding box C for each identified patching cycle and a bounding box R for each identified residual phase (step 403).

Optionally, the results of the machine learning model in identifying individual patching cycles may be improved as follows. If the machine learning model identifies more than one patching cycle within the same time period, the patching cycle with the highest probability of being a patching cycle, as per the machine learning model, is preserved (i.e., selected as a patching cycle); the other patching cycles are discarded (i.e., not considered as a patching cycle). Because the timestamps of when the patches have been published are known, only bounding boxes C of patching cycles with start and end timestamps that are consistent with the publication timestamps are preserved. A bounding box C with inconsistent timestamps are discarded. In the present disclosure, a timestamp is "consistent" with another timestamp if the timestamps are within a predetermined time range, e.g., within a day to accommodate for time zone differences.

Optionally, the results of the machine learning model in identifying individual residual phases may be improved as follows. A bounding box R of residual phase must have a starting timestamp that is between publication timestamps of two consecutive patches; otherwise, the bounding box R is discarded. A bounding box R must have an ending timestamp that is consistent with the publication timestamp of the following patch (e.g., within a day); otherwise, the bounding box R is discarded.

The results of the machine learning model in identifying individual residual phases may be further improved by:
 (a) Using data points within a bounding box R of residual phase, calculate the average of percentage of vulnerable endpoints L1 within the bounding box R. L1 can be plotted separately as a horizontal line having a vertical value that is equal to the Residual Vulnerable Percentage.
 (b) Derive a line L2 by linear regression with the data points within the bounding box R.
 (c) Preserve the bounding box R only if the slope of L2 in terms of percentage of vulnerable endpoints per day is less than 1%. It is to be noted that a value of 1% for percentage of vulnerable endpoints is a lenient criteria in that the inventor has observed the slope of L2 to be about less than 0.5% per day for a typical enterprise network.

Continuing the example of FIG. 13, a pair (C, R) of bounding boxes consisting of a bounding box C of a patching cycle and a bounding box R of a residual phase within the bounding box C is identified (step 404). For the pair (C, R), the x-max value (i.e., maximum along the time or horizontal axis of the plot) of the bounding box C and the x-max value of the bounding box R are such that they are very close, e.g., within a predetermined value. This indicates that the residual phase occurs within the patching cycle. In the case where there are multiple bounding boxes R within a bounding box C, pair the bounding box C with the bounding box R that has the highest probability of being that of a residual phase as per the machine learning model.

For the pair (C, R) of bounding boxes, the TTPM of the patching cycle is equal to the x-min value (i.e., minimum along the time or horizontal axis of the plot) of the bounding box R minus the x-min value of the bounding box C (step 405).

For the pair (C, R) of bounding boxes, the size of the residual zone is equal to the average of the percentage of vulnerable endpoints within the bounding box R at the end of the patching cycle (step 406). The Residual Vulnerable Percentage is the average size of the residual zone across the residual phase.

For an identified patching cycle that has no corresponding identified residual phase, the TTPM of the patching cycle is set to the patching cycle time, (i.e., the time from the beginning to the end of the patching cycle) and the size of the residual zone is set to the percentage of vulnerable endpoints at the end of the patching cycle (step 407).

If the plot does not have any identified patching cycle, the patching process of the enterprise network is deemed to be un-managed. In that case, no evaluation is performed for the enterprise network (step 408).

In the case where there is no identifiable patching cycle as in step 408, then the Percentage of Vulnerable Endpoints for all time (i.e., not in terms of patching cycles) suffices as an indicator of patching process performance. For example, if the average of Percentage of Vulnerable Endpoints for all time is very low or zero, this indicates that all endpoints are automatically patched, which is excellent from a patching process management viewpoint. If the average of Percentage of Vulnerable Endpoints for all time is high, e.g., 60% or higher, this serves as a warning signal that patches are not applied in a timely manner to a significant number of affected endpoints.

It is to be noted that TTPM and Residual Vulnerable Percentage may be measured for each patching cycle or over many patching cycles. For example, the TTPM and Residual Vulnerable Percentage may be provided as a statistic, e.g., measured annually as an average or mean value of patching cycles.

For a particular computer program installed in an endpoint of an enterprise network, the TTPM and the Residual Vulnerable Percentage of patching the computer program may be determined as described above to evaluate the performance of the patching process. To protect the enterprise network against vulnerabilities, corrective actions may be performed in response to detecting that the patching process is ineffective and/or inefficient. Patching processes that have patching cycles that do not have a residual phase, a Residual Vulnerable Percentage that is relatively high (e.g., compared to a threshold or a global reference), and/or TTPM that is relatively long indicate problems that need to be investigated by security personnel of the enterprise network. An example corrective action is to assign additional personnel or put more effort in ensuring that patches are installed in as many endpoints as possible in a timely manner.

Figure 14:
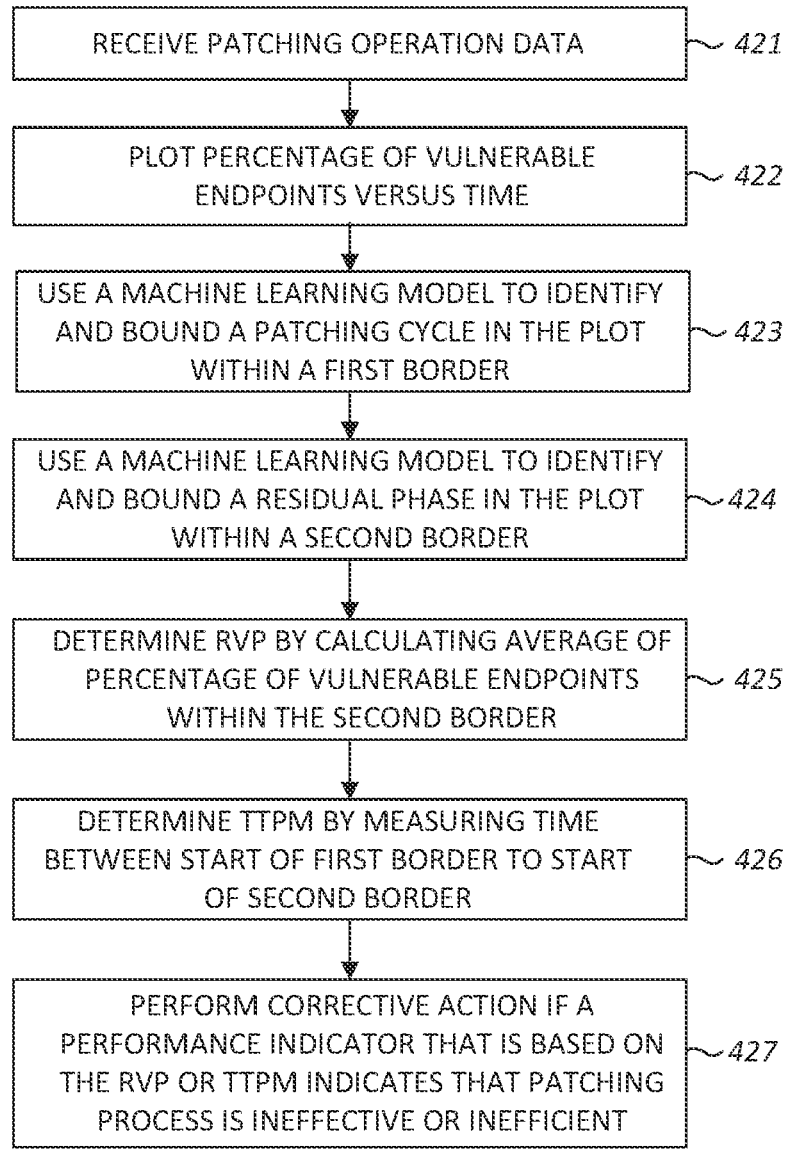
FIG. 14 shows a flow diagram of a method of evaluating a performance of a patching process of an enterprise network in accordance with an embodiment of the present invention.

FIG. 14 shows a flow diagram of a method of evaluating a performance of a patching process of an enterprise network in accordance with an embodiment of the present invention. The method of FIG. 14 may be performed by the backend system 120. As can be appreciated other components may also be employed without detracting from the merits of the present invention.

In the example of FIG. 14, patching operation data are received in an enterprise network (step 421). The patching operation data pertain to a computer program that is installed in a plurality of endpoints that are computers of the enterprise network. The patching operation data indicate a plurality of patches of the computer program received in the enterprise network and installation of the plurality of patches in the endpoints. A plot of percentage of vulnerable endpoints over time is generated from the patching operation data (step 422). A machine learning model identifies and bounds a patching cycle that has a repeating pattern of peaks and valleys in the plot within a first border (e.g., a bounding box C) (step 423). The machine learning model identifies and bounds a residual phase in the plot within a second border (e.g., a bounding box R) (step 424). The machine learning model may be trained to identify the residual phase as occurring during a relatively flat section of the plot between a rapidly decreasing section (e.g., during rapid deployment phase) and a rapidly increasing section (e.g., beginning of a next patching cycle). The second border has a start time that is within the first border (e.g., start time of the bounding box R is within the bounding box C). A Residual Vulnerable Percentage (RVP) is determined by calculating an average of the percentage of vulnerable endpoints within the second border (step 425). A TTPM is determined by measuring a time between the start of the first border to the start of the second border (e.g., time between beginning of the patching cycle to end of the rapid deployment phase; see FIG. 6) (step 426).

A corrective action is performed on the patching process if the RVP or TTPM indicates that the patching process of the enterprise network is ineffective or inefficient (step 427).

For example, a first performance indicator that is based on the RVP may be compared to a first reference. A corrective action may be performed on the patching process in response to the first performance indicator being higher than the first reference, indicating that the patching process is ineffective. The first performance indicator may simply be the RVP itself and the first reference may be a threshold RVP value or a statistic of RVPs of patching processes other enterprise networks (e.g., global RVP). The first performance indicator may also be a statistic value that is based on the RVP. For example, the first performance indicator may be a mean or average of RVPs of residual phases identified in the plot, and the first reference may be a threshold RVP value or a statistic of RVPs of patching processes of other enterprise networks.

As another example, a second performance indicator that is based on the TTPM may be compared to a second reference. A corrective action may be performed on the patching process if the second performance indicator is longer than the second reference, indicating that the patching process is inefficient. The second performance indicator may simply be the TTPM itself and the second reference may be a threshold TTPM value or a statistic of TTPMs of patching processes of other enterprise networks. The second performance indicator may also be a statistic value that is based on the TTPM. For example, the second performance indicator may be a mean or average of TTPMs of patching cycles identified in the plot, and the second reference may be a threshold TTPM value or a statistic of TTPMs of patching processes of other enterprise networks.

A corrective action may include closely monitoring the availability and installation of patches, speeding up installation of patches, ensuring that affected endpoints are available for patching, managing more endpoints for patching, and other actions that improve the effectiveness and efficiency of the patching process.

Figure 15:
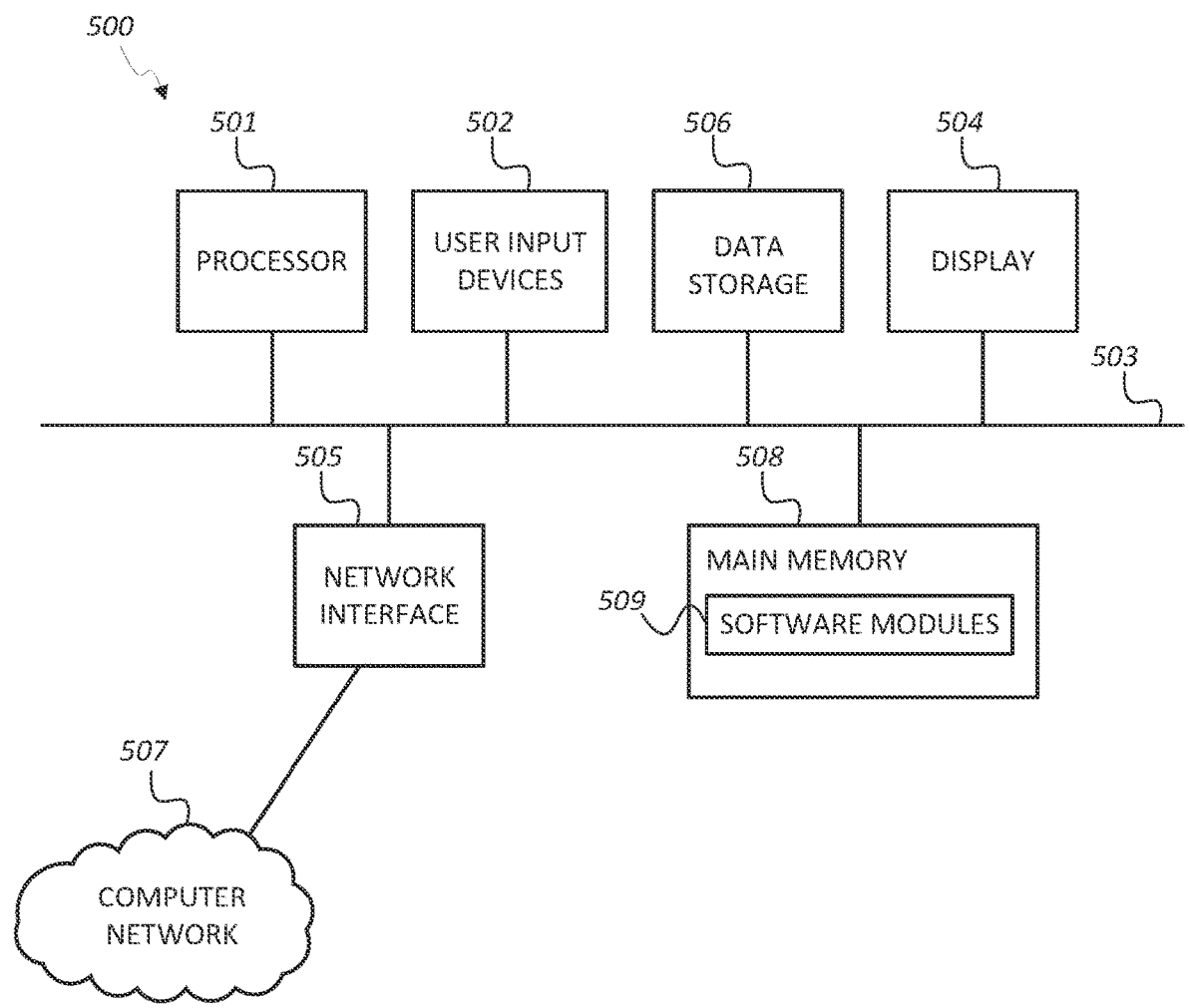
FIG. 15 shows a logical diagram of a computer system that may be employed with embodiments of the present invention.

Referring now to FIG. 15, there is shown a logical diagram of a computer system 500 that may be employed with embodiments of the present invention. The computer system 500 may be employed as a backend system or other computer described herein. The computer system 500 may have fewer or more components to meet the needs of a particular cybersecurity application. The computer system 500 may include one or more processors 501. The computer system 500 may have one or more buses 503 coupling its various components. The computer system 500 may include one or more user input devices 502 (e.g., keyboard, mouse), one or more data storage devices 506 (e.g., hard drive, optical disk, solid state drive), a display screen 504 (e.g., liquid crystal display, flat panel monitor), a computer network interface 505 (e.g., network adapter, modem), and a main memory 508 (e.g., random access memory). The computer network interface 505 may be coupled to a computer network 507, which in this example includes the Internet.

The computer system 500 is a particular machine as programmed with one or more software modules 509, comprising instructions stored non-transitory in the main memory 508 for execution by a processor 501 to cause the computer system 500 to perform corresponding programmed steps. An article of manufacture may be embodied as computer-readable storage medium including instructions that when executed by the processor 501 cause the computer system 500 to be operable to perform the functions of the one or more software modules 509.

In one embodiment where the computer system 500 is configured as a backend system, the software modules 509 comprise evaluation modules for evaluating the performance of a patching process of an enterprise network.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of evaluating a performance of a patching process of an enterprise network, the method comprising:
receiving patching operation data pertaining to a computer program that is installed in a plurality of endpoints that are computers of the enterprise network, the patching operation data indicating a plurality of patches of the computer program received in the enterprise network and installation of the plurality of patches in endpoints of the plurality of endpoints;

generating a plot of percentage of vulnerable endpoints over time, a vulnerable endpoint being an endpoint that is affected by but has not been patched with one or more patches of the plurality of patches;

identifying a plurality of patching cycles in the plot using a machine learning model;

identifying a plurality of residual phases in the plot using the machine learning model, each of the plurality of residual phases occurring during a relatively flat section that is within a patching cycle of the plurality of patching cycles, the relatively flat section being between a decreasing section and an increasing section of the plot;

determining a Residual Vulnerable Percentage (RVP) by calculating an average of percentage of vulnerable endpoints in a residual phase of the plurality of residual phases; and performing a first corrective action on the patching process of the enterprise network in response to a first performance indicator that is based at least on the RVP being higher than a first reference.

2. The method of claim 1, wherein the first reference is a threshold RVP value.

3. The method of claim 1, wherein the first reference is a statistic of RVPs of patching processes of other enterprise networks.

4. The method of claim 1, further comprising:
for each of the plurality of patching cycles, measuring a Time to Patch Managed (TTPM) from a beginning of a patching cycle of the plurality of patching cycles to a beginning of a residual phase of the plurality of residual phases that is within the patching cycle; and performing a second corrective action on the patching process of the enterprise network in response to a second performance indicator that is based at least on the TTPM being longer than the TTPM.

5. The method of claim 4, wherein the second reference is a threshold TTPM value.

6. The method of claim 4, wherein the second reference is a statistic of TTPMs of patching processes other enterprise networks.

7. The method of claim 1, wherein identifying the plurality of patching cycles in the plot using the machine learning model comprises:
bounding each identified patching cycle within a bounding box C.

8. The method of claim 7, further comprising:
discarding the bounding box C when the bounding box C has a start time or an end time that is not within a predetermined time range with a publication timestamp of a corresponding patch of the plurality of patches.

9. The method of claim 7, wherein identifying the plurality of residual phases in the plot using the machine learning model comprises:
bounding each identified residual phase within a bounding box R; and
discarding the bounding box R when the bounding box R has a start time that is not within the bounding box C.

10. The method of claim 1, wherein identifying the plurality of residual phases in the plot using the machine learning model includes bounding each identified residual phase within a bounding box R, and wherein determining the RVP includes calculating an average of percentage vulnerable endpoints within the bounding box R.

11. A method of evaluating a performance of a patching process of an enterprise network, the method comprising:
receiving patching operation data pertaining to a computer program that is installed in a plurality of endpoints that are computers of the enterprise network, the patching operation data indicating a plurality of patches of the computer program received in the enterprise network and installation of the plurality of patches in endpoints of the plurality of endpoints;

generating a plot of percentage of vulnerable endpoints over time, a vulnerable endpoint being an endpoint that is affected by but has not been patched with one or more patches of the plurality of patches;

identifying and bounding a patching cycle that has a repeating pattern in the plot with a first border;

identifying and bounding a residual phase in the plot with a second border, the residual phase being identified as occurring during a relatively flat section of the plot between a decreasing section and an increasing section of the plot, the second border having a start time that is within the first border;

determining a Residual Vulnerable Percentage (RVP) by calculating an average of percentage of vulnerable endpoints within the second border; and performing a first corrective action on the patching process of the enterprise network in response to a first performance indicator that is based at least on the RVP being higher than a first reference.

12. The method of claim 11, further comprising:
ensuring that the first border has a start time and an end time that are consistent with publication of two consecutive patches of the plurality of patches.

13. The method of claim 11, further comprising:
measuring a Time to Patch Managed (TTPM) from a start time of the first border to a start time of the second border; and
performing a second corrective action on the patching process of the enterprise network in response to a second performance value that is based at least on the TTPM being longer than a second reference.

14. A computer system for evaluating a performance of a patching process of an enterprise network, the computer system comprising a memory and at least one processor, the memory storing instructions that when executed by the at least one processor cause the computer system to:
receive patching operation data pertaining to a computer program that is installed in a plurality of endpoints that are computers of the enterprise network, the patching operation data indicating a plurality of patches of the computer program received in the enterprise network and installation of the plurality of patches in endpoints of the plurality of endpoints;

generate a plot of percentage of vulnerable endpoints over time, a vulnerable endpoint being an endpoint that is affected by but has not been patched with one or more patches of the plurality of patches;

identify and bound a patching cycle that has a repeating pattern in the plot with a first border;

identify and bound a residual phase in the plot with a second border, the residual phase being identified as occurring during a relatively flat section of the plot between a decreasing section and an increasing section of the plot, the second border having a start time that is within the first border; and generate an indicator of effectiveness of the patching process by calculating an average of percentage of vulnerable endpoints within the second border.

15. The computer system of claim 14, wherein the instructions stored in the memory of the computer system, when executed by the at least one processor of the computer system, cause the computer system to:

generate an indicator of efficiency of the patching process by measuring a Time to Patch Managed (TTPM) from a start time of the first border to a start time of the second border.

* * * * *